Feb. 6, 1968     H. DE CORTA     3,368,060
METHOD AND APPARATUS FOR HEATING CYLINDRICAL ELEMENTS
Filed July 26, 1965     2 Sheets-Sheet 1

INVENTOR
Hubert De Corta
By
Hammond and Littell
ATTORNEYS

Feb. 6, 1968       H. DE CORTA       3,368,060
METHOD AND APPARATUS FOR HEATING CYLINDRICAL ELEMENTS
Filed July 26, 1965       2 Sheets-Sheet 2
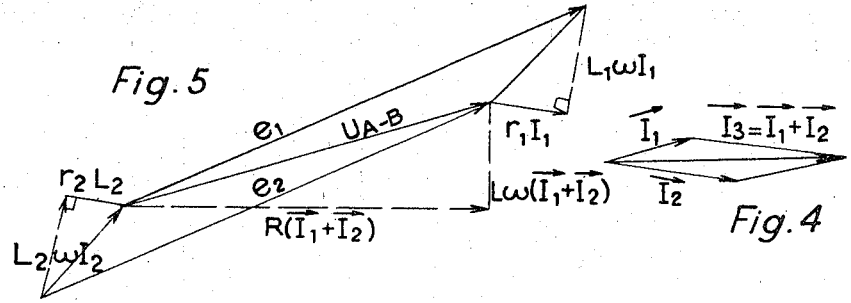
Fig. 5
Fig. 4
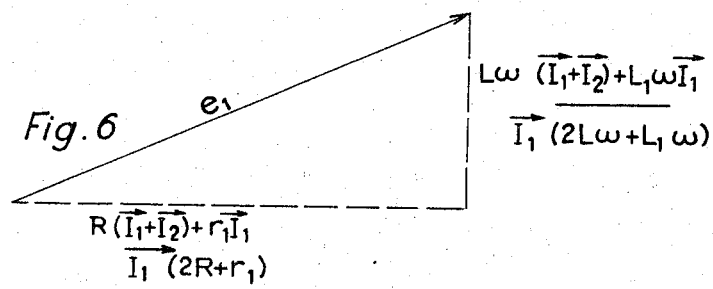
Fig. 6
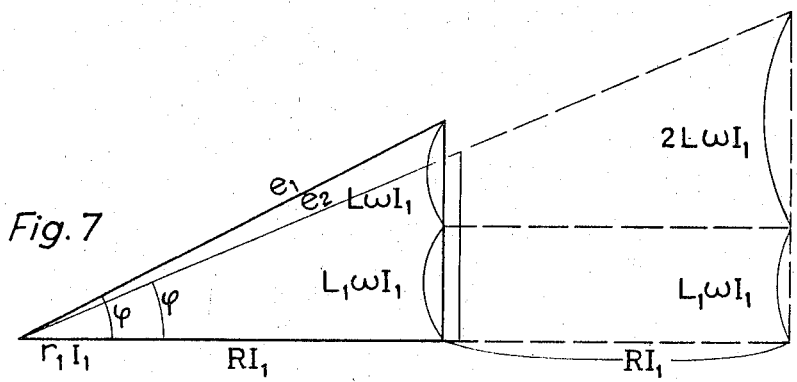
Fig. 7
INVENTOR
Hubert De Corta
By Hammond and Littell
ATTORNEYS United States Patent Office 3,368,060
Patented Feb. 6, 1968

3,368,060
METHOD AND APPARATUS FOR HEATING CYLINDRICAL ELEMENTS
Hubert De Corta, Fontenay-sous-Bois, France, assignor to Firma Friedrich Kocks, a company of Germany
Filed July 26, 1965, Ser. No. 474,801
Claims priority, application France, July 29, 1964, 983,454
4 Claims. (Cl. 219—155)

ABSTRACT OF THE DISCLOSURE

This invention relates to a process and apparatus for heating cylindrical elements or tubes during manufacture comprising passing the elements between at least two upstream and two downstream cages, the first upstream cage and the first downstream cage being fed with electric current through a transformer, the second upstream cage and the second downstream cage likewise being fed with electric current through the same or a second transformer in such a manner as to produce inphase electromotive forces.

---

This invention relates to the heating of cylindrical metal elements, more particularly tubes, by the passage of an electric current through the constituent material of the element. Some advantage may be gained by such an operation during the manufacture of welded metal tubes, particularly steel tubes. In this case, the tube travels between at least two cages or devices feeding the current to the tube, for example in the form of rollers, brushes or sliding contacts, etc. The cages are supplied with current from a transformer which is itself connected to the supply mains.

It would be desirable for various reasons to increase the intensity of the current flowing through the tube. Unfortunately, there are limits to the extent of such an increase because it has been found that an excessive current intensity marks the surface of the tube, and leads to a rapid deterioration of the elements supplying the current to it.

It would also be possible to increase the number of cages by mounting them in parallel arrangement, in which case the tube travels, for example, through two upstream cages mounted in parallel, and then through two downstream cages also mounted in parallel. However, in view of the fact that the current takes the easiest course, i.e. the course of minimum impedance, the upstream and downstream cages nearest each other become overloaded, whilst the two upstream and downstream cages further away from one another are practically superfluous.

The invention relates to an improvement which, according to one of its aspects, enables the intensity of the current flowing through the tube to be increased.

To this end, the tube is passed between at least two upstream cages and two downsteram cages, the arrangement being such that the first upstream cage and the first downstream cage are fed with electric current from a first generator, whilst the second upstream cage and the second downstream cage are also fed from a second generator. The two generators are connected in parallel and generate inphase electromotive forces.

The two generators may be in the form of a parallel arrangement of two identical secondary windings of one transformer connected to the supply mains. They may also be in the form of a parallel arrangement of two secondary windings of two identical transformers connected to the same phase of the supply mains.

This arrangement enables the various cages to be equally charged. As a result, the intensity of the current flowing through that section of the tube between the last upstream and ahe first downstream cage may be doubled where there are two upstream and two downstream cages, in camparison with the intensity of the current flowing through the tube when only one upstream and one downstream cage is used.

In addition, such an improvement enables the length of the plant or installation to be proportionally reduced when there is a given current intensity threshold which the tube is able to withstand. For example, in cases where there are two upstream and two downstream cages instead of just one, the reduction in the length of the installation is of the order of 50%. Correlatively, the intensity of the current may be doubled in the same example without substantially increasing the length of the installation.

Broadly speaking, the improvement according to the invention is advantageous in cases where the power factor (cos $\varphi$) can be improved. In effect, the rise in temperature accompanying the increase in the intensity of the current flowing through the tube is more rapid with the result that the resistance per unit length is greater. Since the reactance per unit length remains constant, the power factor cos $\varphi$, is improved. The arrangement according to the invention may also be used to advantage in cases where it is required to heat large-diameter tubes of very low resistance.

The invention is illustrated by the following description in conjunction with the accompanying drawings, in which:

FIG. 1 diagrammatically illustrates a conventional single-winding installation, i.e. an installation comprising one upstream cage and one downstream cage.

FIG. 2 diagrammatically illustrates an installation comprising two upstream cages and two downstream cages mounted in accordance with the invention.

FIG. 4 is a current intensity diagram.

FIG. 5 is a voltage diagram.

FIG. 6 is a simplified diagram, and

FIG. 7 is a diagram showing the improvement obtained in the power factor.

Figure 1:
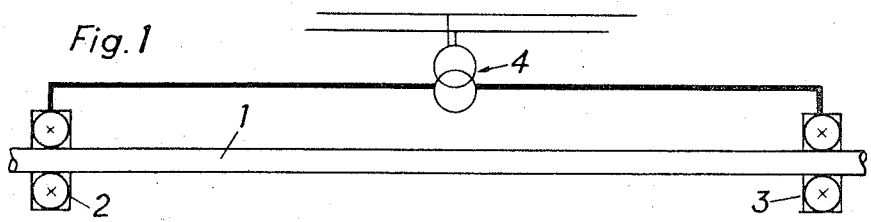

To recall the prior art, the arrangement of a heating stage in an installation for manufacturing welded tubes is diagrammatically illustrated in FIG. 1.

The tube travels through an upstream heating cage 2 and through a downstream heating cage 3. These two cages are connected to the secondary winding of a transformer 4 connected to the supply mains. In the case of a metal tube, for example a steel tube, the electric circuit is made by the tube through which an electric current flows. The arrangement shown in FIG. 1 is therefore in the form of a winding consisting partly of a given length of the tube which, in the example shown, passes continuously through the installation.

Figure 2:
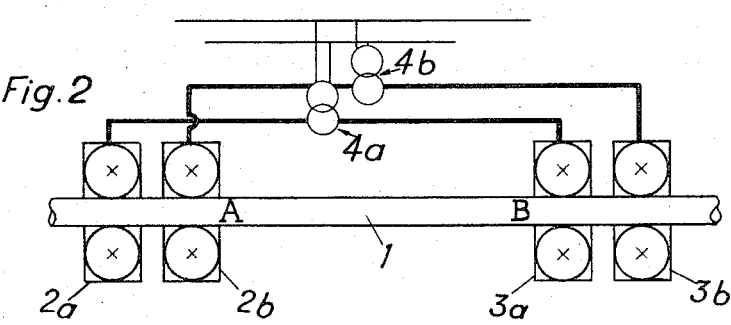

In the embodiment according to the invention, as shown in FIG. 2, there are two upstream cages 2a and 2b and two downstream cages 3a and 3b. The first upstream cage 2a and the first downstream cage 3a are both connected to the secondary winding of a transformer 4a. The second upstream cage 2b and the second downstream cage 3b both connected to the secondary winding of a second transformer 4b. The two transformers 4a and 4b which are identical are connected in parallel to the same phase of the supply mains. Instead of two transformers 4a and 4b, it would be possible to connect in parallel two identical secondary windings of one transformer. What is important, however, is that there should be two generators connected in parallel whose electromotive forces are in phase, for the two groups of cages as defined in the foregoing. With the aforementioned arrangement of the windings, it will be seen that, according to the invention, overlapping windings are formed. In the example shown, there are two such windings. In this case, all the cages are charged equally, and the intensity of the current flowing through that section of the tube A–B between the last upstream cage and the first downstream cage may be doubled in relation to that which would be obtained with a single-winding arrangement of the type shown in FIG. 1.

Figure 3:
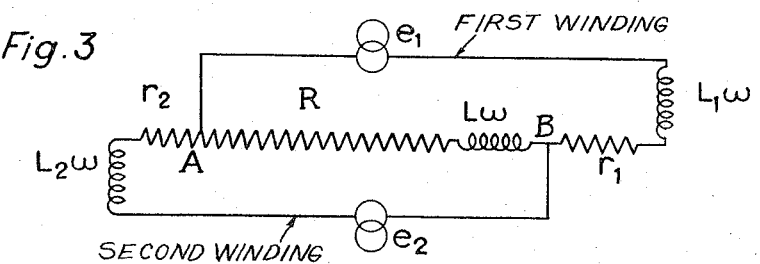
FIG. 3 is a circuit diagram for the arrangement shown in FIG. 2.

The equivalent electric circuit corresponding to the arrangement shown in FIG. 2 is shown in FIG. 3. If $e_1$ and $e_2$ are the electromotive forces of the two generators, then $e_1 = e_2$. In addition, the reference R represents the resistance of that section A–B of the tube which is common to both the windings, the references $r_1$ and $r_2$ represent the resistances between the downstream cages and the upstream cages, respectively, the reference $L\omega$ represents the reactance of the section common to both windings corresponding to the section A–B, the references $L_1\omega$ and $L_2\omega$ represent the reactances of the remaining part of the first winding and of the second winding, respectively.

If the diagram of intensities is drawn, the parallelogram shown in FIG. 4 is obtained. The voltage diagram is shown in FIG. 5 with the following references:

$R(\vec{I_1}+\vec{I_2})$=ohmic voltage drop in the section common to both windings;

$L\omega(\vec{I_1}+\vec{I_2})$=inductive voltage drop in the section common to both windings;

$r_1\vec{I_1}$=ohmic voltage drop in the remaining section of the first winding;

$L_1\omega\vec{I_1}$=inductive voltage drop in the remaining section of the first winding;

$r_2\vec{I_2}$=ohmic voltage drop in the remaining section of the second winding;

$L_2\omega\vec{I_2}$=inductive voltage drop in the remaining section of the second winding.

Assuming that $\vec{I_1}=\vec{I_2}$ and hence that $L_1\omega=L_2\omega$ and $r_1=r_2$, the simplified diagram shown in FIG. 6 may be drawn. In order to illustrate the improvement which may be obtained in cos $\varphi$ by using two overlapping windings in accordance with the invention in place of a single winding as shown in FIG. 1, the two superimposed diagrams corresponding to the simplified diagram shown in FIG. 6 in the two cases under consideration, are illustrated in FIG. 7. It can be seen that the angle $\varphi$ is always decreased which corresponds to an increase in cos $\varphi$ or power factor.

Consequently, it is possible by means of the arrangement according to the invention to improve this power factor and, with an equivalent length of installation, to increase the intensity of the current flowing through the tube or, with an equivalent intensity of the current flowing through the tube, to reduce the length of the installation due to the fact that the quantity of calories used per unit length is increased.

The following comparative example is given as an illustration, although it should not be regarded as limiting the scope of the invention in anyway. In an installation for manufacturing welded steel tubes, two heating stages were constructed with the aid of an arrangement comprising two single windings of the type shown in FIG. 1. The power input was equal to 2×1.070 kva. The current which flowed through the tube was of the order of 30.00 amperes, and it was found that the power feeder (cos $\varphi$) of the first winding was equal to 0.62 whilst the power factor (cos $\varphi$) of the second winding was equal to 0.84.

It was found that cos $\varphi$ is increased to 0.9 in an arrangement according to the invention comprising two overlapping windings by using the same installed power of 2.140 kva., giving rise to the passage of a current of the order of 60.00 amperes in the tube.

In addition, an improvement of the order of 50% was obtained in the first case over an 8 metre section of installation.

The invention is of course not limited to the embodiment which has been described in the foregoing. It also covers the numerous modifications which could be made to this embodiment. For example, the two overlapping windings shown in FIG. 2 could be replaced by a larger number of windings, in which case the transfer from two to three or more windings could be carried out in a manner which will be obvious to the expert.

What is claimed is:

1. A method of heating cylindrical elements, during their manufacture, comprising the step of passing the elements between at least two upstream and two downstream cages, the first upstream cage and the first downstream cage being fed with electric current through a first transformer, the second upstream cage and the second downstream cage likewise being connected with a supply of electric curent through a second transformer, said transformers being arranged in parallel and produce in phase electromotive forces.

2. A method as claimed in claim 1 in which said transformers are identical and have secondary windings connected to the same phase of a supply mains, in parallel.

3. A method of heating cylindrical elements during manufacture comprising the step of passing the elements between at least two upstream and at least two downstream cages, the first of said downstream cages and the first of said upstream cages being fed with electric current through a first secondary winding of a transformer and the second of said downstream cages and the second of said upstream cages being fed with electric current through a second secondary winding of said transformer, said first and second windings being identical and arranged in parallel.

4. An apparatus for heating metal tubes during manufacture comprising at least two upstream and two downstream cages, the first upstream cage and the first downstream cage being arranged in such a way as to form a first winding with the tube, the second upstream cage and the second downstream cage also being arranged in such a way as to form a second winding with the tube, the different windings thus formed each being fed by a generator, the arrangement being such that the various generators connected in parallel produce inphase electromotive forces.

References Cited

UNITED STATES PATENTS

| 2,259,260 | 10/1941 | Matteson et al. | 219—155 X |
| 2,894,115 | 7/1959 | Alf | 219—155 |
| 3,313,269 | 4/1967 | Hough | 219—50 X |

FOREIGN PATENTS

| 134,098 | 5/1919 | Great Britain. |
| 40,580 | 8/1965 | Germany. |

RICHARD M. WOOD, *Primary Examiner.*

B. A. STEIN, *Assistant Examiner.*